US009469794B2

(12) United States Patent
Liu et al.

(10) Patent No.: US 9,469,794 B2
(45) Date of Patent: Oct. 18, 2016

(54) CATIONIC UV-CROSSLINKABLE ACRYLIC POLYMERS FOR PRESSURE SENSITIVE ADHESIVES

(71) Applicant: HENKEL IP & HOLDING GMBH, Duesseldorf (DE)

(72) Inventors: Yuxia Liu, Dayton, NJ (US); Peter Palasz, Maidenhead (GB); Charles W. Paul, Madison, NJ (US); Paul B. Foreman, Somerville, NJ (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 116 days.

(21) Appl. No.: 14/309,420

(22) Filed: Jun. 19, 2014

(65) Prior Publication Data
US 2014/0303274 A1 Oct. 9, 2014

Related U.S. Application Data

(63) Continuation of application No. 13/606,066, filed on Sep. 7, 2012, which is a continuation of application No. PCT/US2011/027632, filed on Mar. 9, 2011.

(60) Provisional application No. 61/311,970, filed on Mar. 9, 2010.

(51) Int. Cl.
*C09J 137/00* (2006.01)
*C08F 220/28* (2006.01)
*C09J 7/02* (2006.01)
*C09J 133/06* (2006.01)
*C09J 143/04* (2006.01)
*C09J 133/14* (2006.01)

(52) U.S. Cl.
CPC ............ *C09J 137/00* (2013.01); *C08F 220/28* (2013.01); *C09J 7/0217* (2013.01); *C09J 133/06* (2013.01); *C09J 133/14* (2013.01); *C09J 143/04* (2013.01); *C08F 2220/281* (2013.01); *C08L 2312/06* (2013.01); *C09J 2205/31* (2013.01); *C09J 2423/106* (2013.01); *C09J 2467/006* (2013.01); *Y10T 428/28* (2015.01); *Y10T 428/287* (2015.01); *Y10T 428/2809* (2015.01); *Y10T 428/2826* (2015.01); *Y10T 428/2852* (2015.01); *Y10T 428/2878* (2015.01); *Y10T 428/2891* (2015.01); *Y10T 428/31504* (2015.04); *Y10T 428/31511* (2015.04); *Y10T 428/31855* (2015.04)

(58) Field of Classification Search
CPC .... C09J 137/00; C09J 143/04; C09J 133/06; C09J 7/2017; C09J 133/16; C08F 220/28; Y10T 428/2809; Y10T 428/2852; Y10T 428/287
See application file for complete search history.

(56) References Cited

U.S. PATENT DOCUMENTS

| | | | |
|---|---|---|---|
| 5,446,176 A | 8/1995 | Kuwana et al. | |
| 5,536,759 A | 7/1996 | Ramharack et al. | |
| 5,985,952 A | 11/1999 | Levy | |
| 6,180,200 B1 | 1/2001 | Ha et al. | |
| 6,423,378 B1 | 7/2002 | Cotting et al. | |
| 6,512,022 B2 | 1/2003 | Husemann et al. | |
| 6,703,073 B2 | 3/2004 | Husemann et al. | |
| 6,718,992 B1 | 4/2004 | Cardola et al. | |
| 6,780,898 B2 | 8/2004 | Kumakura | |
| 6,790,310 B2 | 9/2004 | Nakasuga et al. | |
| 6,794,451 B2 | 9/2004 | Sasaki et al. | |
| 6,803,081 B2 | 10/2004 | Paul | |
| 7,087,696 B2 | 8/2006 | Wiesendanger et al. | |
| 7,521,487 B2 | 4/2009 | Hansen et al. | |
| 2004/0054081 A1 | 3/2004 | Husemann et al. | |
| 2005/0095528 A1 | 5/2005 | Liu et al. | |
| 2006/0142408 A1 | 6/2006 | Liu et al. | |
| 2009/0258963 A1 | 10/2009 | Moore | |
| 2010/0129568 A1 | 5/2010 | Kim et al. | |

FOREIGN PATENT DOCUMENTS

| | | |
|---|---|---|
| EP | 0785974 B1 | 7/1997 |
| EP | 0819746 A2 | 1/1998 |
| EP | 1315761 B1 | 12/2004 |
| EP | 1854442 A2 | 7/2009 |
| GB | 852019 A | 10/1960 |
| JP | 62050377 A | 3/1987 |
| JP | 63260978 A | 10/1988 |
| JP | 1186876 A | 7/1989 |
| JP | 04244074 A | 9/1992 |
| JP | 860127 A | 3/1996 |
| JP | 2562620 B2 | 12/1996 |
| JP | 2797000 B2 | 9/1998 |
| JP | 200026830 A | 1/2000 |
| JP | 2003147311 A | 5/2003 |
| JP | 2003336025 A | 11/2003 |
| JP | 2005533919 A | 11/2005 |
| JP | 2008208149 A | 9/2008 |
| WO | 8100309 A1 | 2/1981 |
| WO | 9116387 A1 | 10/1991 |

OTHER PUBLICATIONS

International Search Report and Written Opinion, dated Nov. 29, 2011, International Application PCT/US2011/027632.
Yoo, Woo-Jin et al. "Highly Efficient Oxidative Amidation of Aldehydes with Amine Hydrochloride Salts," J. Am. Chem. Soc., vol. 128, No. 40, Jul. 2006, pp. 13064-13065.
Product Data Sheet: Licocene PP 1302 granules. CLARIANT, Version 8, 2014. Retrieved on Oct. 8, 2014 from http://www.clariant.com/bu/additives/PDS_Additives.nsf/www/DS-OSTS-7SHEC4?open.

*Primary Examiner* — Sanza McClendon
(74) *Attorney, Agent, or Firm* — Sun Hee Lehmann

(57) ABSTRACT

An ultraviolet (UV) crosslinkable acrylic pressure sensitive adhesive comprises an acrylic copolymer and a cationic photoinitiator. The acrylic copolymer comprises pendant reactive functional groups. The pressure sensitive adhesive formed from the acrylic copolymer with the pendant reactive functional groups result in high green strength and/or high temperature holding strength of the adhesive.

4 Claims, 1 Drawing Sheet

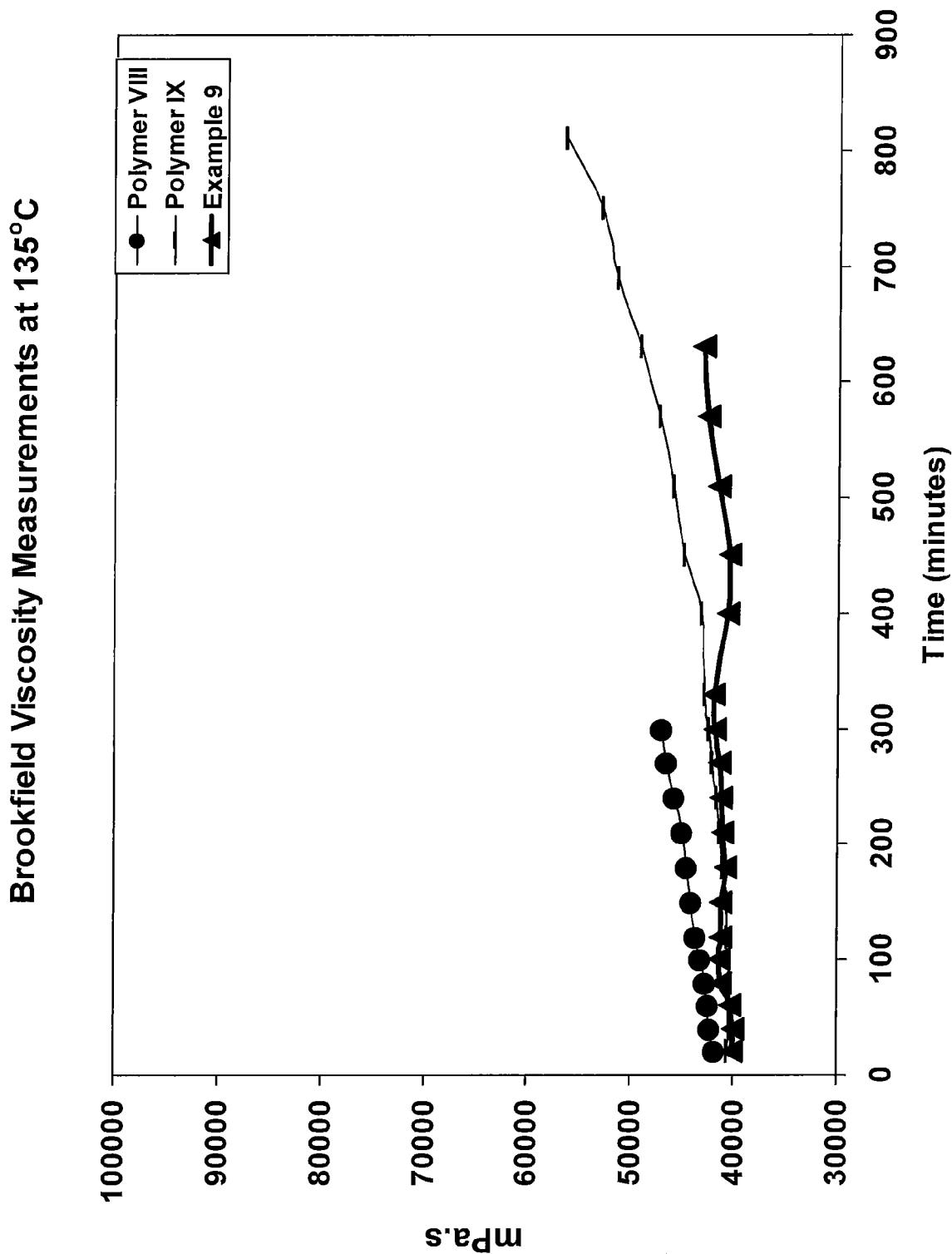

CATIONIC UV-CROSSLINKABLE ACRYLIC POLYMERS FOR PRESSURE SENSITIVE ADHESIVES

CROSS-REFERENCES TO RELATED APPLICATIONS

This application is a continuation of U.S. patent application Ser. No. 13/606,066 filed Sep. 7, 2012, which is a continuation of International Patent Application No. PCT/US2011/27632 filed Mar. 9, 2011, which claims the benefit of U.S. Provisional Patent Application No. 61/311,970 filed Mar. 9, 2010, the contents of all of which are incorporated herein by reference.

FIELD OF THE INVENTION

The invention relates to an ultra-violet curable pressure sensitive adhesive comprising an acrylic polymer with pendant reactive functional groups.

BACKGROUND OF THE INVENTION

Pressure sensitive adhesives (PSAs) are aggressive and permanently tacky at room temperature and adhere to surfaces by application of light finger pressure. PSA compositions are commonly applied to various substrates, such as paper, fabric, metal, and plastic films that are then converted into a large number of different products, especially pressure sensitive adhesive tapes and labels. These pressure sensitive adhesive products have a broad field of application in the automobile industry, e.g., for fastening or sealing, in the pharmaceutical industry, e.g., for bandages or transdermal drug delivery systems, or in the packaging industry, e.g., for sealing, bonding or labeling.

PSAs can be formulated for application as a solvent borne or a molten adhesive. Hot melt pressure sensitive adhesives (HMPSAs) are compositions that combine the properties of hot melt adhesives with those of pressure sensitive adhesives. Hot melt adhesives are solids at room temperature, melt at elevated temperatures to coat on a substrate, and regain their solid form on cooling. The combination of these properties provides compositions that melt at elevated temperatures and cool to form a permanently tacky solid coating that adheres on contact. A good workable HMPSA must exhibit high cohesive strength at room temperature, low shrinkage on substrates, retention of pressure sensitive properties during storage and use, and a relatively fluid viscosity at typical coating temperatures (e.g., between 80° C. and 180° C.). Although very low molecular weight polymers will yield hot melt adhesives with sufficient fluidity, the resulting adhesives lack cohesive strength. Very high molecular weight polymers give better cohesive strength, but are too viscous at the common application temperatures to be easily coatable on substrates. They must be blended with a high proportion of low molecular weight oils or resins to reduce the viscosity. The addition of low molecular weight oils or resins in turn detracts from the cohesive strength and heat resistance. To avoid these problems, polymers of moderate molecular weight have been made with various functional groups which undergo crosslinking reactions by heat or actinic radiation. In this manner, the cohesion of acrylic PSAs can be raised by means of sufficient crosslinking.

Acrylic polymers with epoxy functional groups have been known in prior art. An example of such polymers are described in JP 1186876, however, these polymers fail to crosslink under UV radiation and/or heat.

JP2008-208149 is directed to acrylic copolymers with non free radical polymerizable oxetane compounds as a polymerization medium and reactive diluent. The polymerization is completed with heat and/or x-ray irradiation to form an adhesive for a flat panel display.

JP 08-060127 and 199606127 describe UV-curable acrylic polymers but require the addition of multifunctional polyol and other hydroxyl-functional groups for crosslinking the polymers.

JP2003147311 is directed to the use of photopolymerizable diacrylate. Due to the difunctional acrylate which crosslinks upon radical polymerization, it is less desirable for use in an adhesive, and especially unsuitable for a solvent borne or hot melt adhesive, because it is necessary to polymerize the acrylate monomers following application onto the final coated substrate.

There is an ongoing demand and a continuing need in the art for UV-crosslinkable acrylic polymers that can be formulated as solvent borne adhesives and/or that are hot melt processable. The current invention addresses this need by providing acrylic polymers that are functionalized with pendant reactive functional groups and cationic photoinitiators and, following the coating operation, are crosslinked under UV irradiation on the substrates. The invention provides the art with both solvent borne acrylic PSAs and hot melt acrylic PSAs.

SUMMARY OF THE INVENTION

The invention provides cationic ultra-violet-curable pressure sensitive adhesive comprising (a) crosslinkable acrylic polymers which comprise pendant reactive functional groups and (b) a cationic photoinitiator.

In one embodiment, the crosslinkable acrylic polymer (a) of the adhesive comprises (i) an acrylic monomer which is an acrylic or methacrylic acid derivative of the formula $CH_2=CH(R_1)(COOR_2)$, wherein $R_1$ is H or $CH_3$ and $R_2$ is $C_{1-20}$ alkyl chain and (ii) a monomer with a pendant reactive functional group selected from cycloaliphatic epoxide, oxetane or mixtures thereof, and the amount of the monomer (ii) is from about 0.001 to about 0.015 equivalent per 100 g of the acrylic polymer. The acrylic polymer is essentially free of multi-(meth)acrylate, polyol or OH-functional groups and the polymer remains substantially linear after polymerization.

In another embodiment, the crosslinkable acrylic polymer (a) of the adhesive comprises (i) an acrylic monomer which is an acrylic or methacrylic acid derivative of the formula $CH_2=CH(R_1)(COOR_2)$, wherein $R_1$ is H or $CH_3$ and $R_2$ is $C_{1-20}$ alkyl chain and (ii) a monomer with a combination of pendant reactive functional groups selected from (1) cycloaliphatic epoxide, oxetane, benzophenone or mixtures thereof, and (2) mono-substituted oxirane; and the amount of the monomer (ii) is the amount of about 0.001 to about 0.015 equivalent per 100 g of the acrylic polymer. The acrylic polymer is essentially free of multi-(meth)acrylate, polyol or OH-functional groups and the polymer remains substantially linear after polymerization.

In a further embodiment, the cationic photoinitiator (b) the adhesive has the structure of

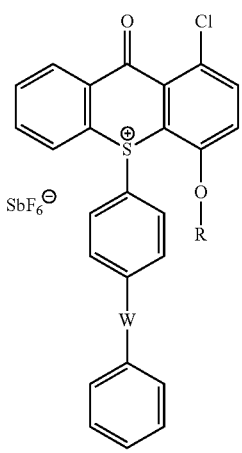

where R is $C_3H_7$, $C_{12}H_{25}$, W is S, SO, $SO_2$ or CO.

In another embodiment, the cationic ultra-violet-curable pressure sensitive adhesive further comprises a polyethylene copolymer additive, plasticizer, fillers, inhibitors, antioxidants, accelerators, tackifier and/or solvent.

A further embodiment is directed to a method of preparing a crosslinkable acrylic polymer which comprises pendant reactive functional groups.

Yet another embodiment is directed to an article manufactured using the adhesives of the invention. The adhesive is in a form of a solvent borne acrylic pressure sensitive adhesive or an acrylic hot melt pressure sensitive adhesive. The adhesive article further comprises a backing which is a polyester, polypropylene, metal or glass. The adhesives are particularly advantageous as a tape, an adhesive transfer film, a decorative or protective film, decal or label.

BRIEF DESCRIPTION OF THE DRAWING FIGURES

FIG. 1 is a graph of viscosity over time at 130° C., measured by Brookfield viscometer.

DETAILED DESCRIPTION OF THE INVENTION

The invention provides the art with acrylic polymers comprising UV-reactive pendant functional groups bound to the polymer chain. Depending upon the bound functional groups, the acrylic polymer undergoes fast UV-crosslinking reaction and provides green strength and/or undergoes post-UV crosslinking in the presence of a cationic photoinitiator to results in adhesives with high cohesive strength and high temperature holding strength.

The choice and relative amount of the specific acrylic and vinyl monomers making up the acrylic polymers used in preparing the adhesives of this invention depend upon the desired final properties and contemplated end uses of the adhesives. The choices of which acrylic and vinyl monomers and their relative amounts in the final composition to achieve the desired properties are within the expertise of those skilled in the art.

In one embodiment of the invention, the acrylic polymers are those having the following composition or those that can be prepared by polymerizing (i) an acrylic monomer which is an acrylic or methacrylic acid derivative (e.g. methacrylic acid ester) of the formula $CH_2=CH(R^1)(COOR^2)$, where $R^1$ is H or $CH_3$ and $R^2$ is a $C_{1-20}$, preferably $C_{1-8}$, alkyl chain and (ii) a monomer with a pendant reactive functional group, which is described in more detail herein below, and the amount of the monomer (ii) is from about 0.001 to about 0.015 equivalent per 100 g of the acrylic polymer. In a more preferred embodiment, the amount of the monomer is from about 0.002 to about 0.01 equivalent per 100 g of the acrylic polymer.

For the polymerization process of the invention the monomers of components (i) and (ii), where appropriate, are converted by radical polymerization into acrylic polymers. In polymerization, the monomers are chosen such that the resulting polymers can be used to prepare adhesives, especially such that the resulting polymers possess pressure sensitive adhesive properties in accordance with the "Handbook of Pressure Sensitive Adhesive Technology" by Donatas Satas (van Nostrand, N.Y. 1989).

Examples of acrylates and/or methacrylates useful as components of monomer mixture (i) include methyl acrylate, ethyl acrylate, ethyl methacrylate, methyl methacrylate, n-butyl acrylate, n-butyl methacrylate, n-pentyl acrylate, n-hexyl acrylate, n-heptyl acrylate, and n-octyl acrylate, n-nonyl acrylate, lauryl methacrylate, cyclohexyl acrylate, and branched (meth)acrylic isomers, such as i-butyl acrylate, i-butyl methacrylate, n-butyl methacrylate, 2-ethylhexyl acrylate, stearyl methacrylate, and isooctyl acrylate. The exemplary acrylates and/or methacrylates are mono-acrylic monomers, and do not include any di or multi-acrylate monomers.

The exemplary acrylic monomer mixture (i) has a Tg value less than 0° C. and a weight average molecular weight from about 10,000 to about 2,000,000 g/mol more preferably between 50,000 and 1,000,000 g/mol and most preferably between 100,000 and 700,000 g/mol. The mixture (i) may be a single monomer provided that its homopolymer Tg is less than 0° C.

Suitable monomer (ii) of the polymer is capable of undergoing cationic UV-activated crosslinking reaction and providing green strength to the adhesive films, include cycloaliphatic epoxide monomers M100 and A400 (Daicel), oxetane monomer OXE-10 (Kowa Company), dicyclopentadienyl methacrylate (CD535, Sartomer Co., PA) epoxide, 4-vinyl-1-cyclohexene-1,2-epoxide (Dow). Other exemplary monomers (ii) include vinyl or acrylic compounds containing cationic UV-reactive functional groans with the formula (1):

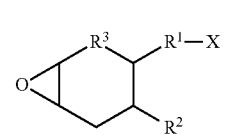

(1)

where
$R^1$ is O, S, C=O, or linear, branched, or cyclic alkylene, oxyalkylene, or arylene,
$R^2$ is linear, branched, or cyclic alkyl, or alkoxy, aryl, H, halogen, C=O, or part of $R^1$ as fused cycloaliphatic ring through a covalent bond connection,
$R^3$ is $(CH_2)_n$, n=0-3,
X is acrylate, methacrylate or comprises a —W—Y group, where
W is O, S, amide, carbonate, urethane, urea, siloxane or a combination thereof, and Y is —R⁴—C(R⁵)=CH₂, where R⁴ is a linear or branched C$_{2-10}$ alkylene or C$_{2-10}$oxyalkylene, arylene, or derivatives thereof, and R⁵ is H or CH₃.

A preferred vinyl or acrylic compound for use as monomer (ii) is represented by the structural formula (1A):

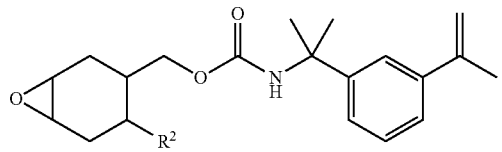

(1A)

where R²=H or CH₃,

Another preferred vinyl or acrylic compound for use as monomer (ii) is represented by the structural formula (1B):

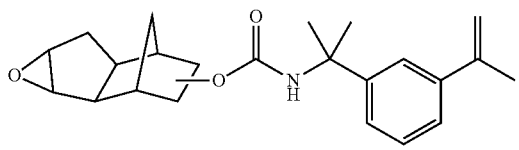

(1B)

Another preferred vinyl or acrylic compound for use as monomer (ii) is represented by the structural formula (1C):

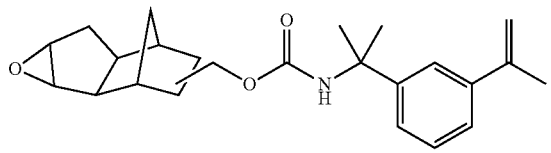

(1C)

Yet another preferred vinyl or acrylic compound for use as monomer (ii) is represented by the structural formula (1D):

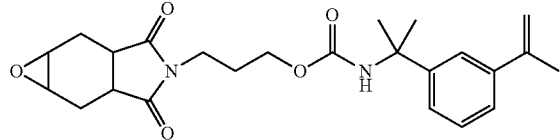

(1D)

Yet another preferred vinyl or acrylic compound for use as monomer (ii) is represented by the structural formula (1E):

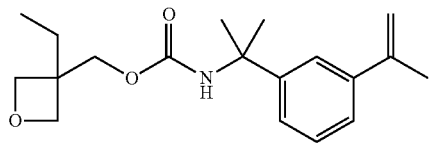

(1E)

Yet another preferred vinyl or acrylic compound for use as monomer (ii) is represented by the structural formula (1F):

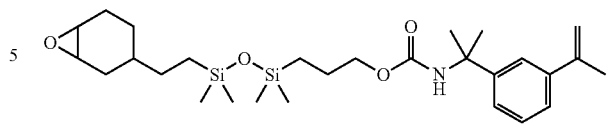

(1F)

Yet another preferred vinyl or acrylic compound for use as monomer (ii) is represented by the structural formula (1G):

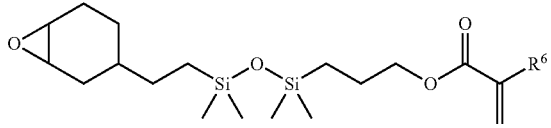

(1G)

where R⁶=H or CH₃.

Yet another preferred vinyl or acrylic compound for use as monomer (ii) is represented by the structural formula (1H):

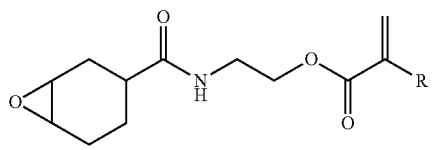

(1H)

where R=H or CH₃.

In another embodiment of the invention, the acrylic polymers are capable of undergoing post-UV cationic activated reaction and thus, provide high temperature holding strength to the adhesive films. The acrylic polymers are those having the following composition or those that can be prepared by polymerizing (i) an acrylic monomer which is an acrylic or methacrylic acid derivative of the formula CH₂=CH(R₁)(COOR₂), wherein R₁ is H or CH₃ and R₂ is C$_{1-20}$ alkyl chain and (ii) a monomer with a combination of pendant reactive functional groups selected from both (1) cycloaliphatic epoxide, oxetane, benzophenone or mixtures thereof, and (2) mono-substituted oxirane. The amount of the monomer (ii) is the amount of about 0.001 to about 0.015 equivalent per 100 g of the acrylic polymer. The acrylic polymer is essentially free of multi-(meth)acrylate, polyol or OH-functional groups and the polymer remains substantially linear after polymerization. In a more preferred embodiment, the amount of the monomer (ii) is from about 0.002 to about 0.01 equivalent per 100 g of the acrylic polymer.

Examples of suitable acrylic monomer mixture (i) have been described herein.

Examples of monomer (ii) with cycloaliphatic epoxide and oxetane pendant reactive functional groups (1) have also been described herein.

Suitable monomer (ii) with benzophenone pendant reactive function groups (1) include the compounds of the following formula (2), (3), and (4):

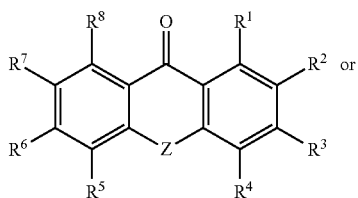

(2)

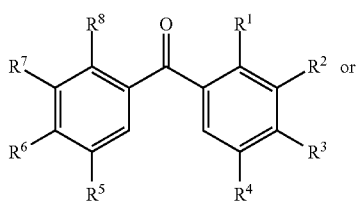

(3)

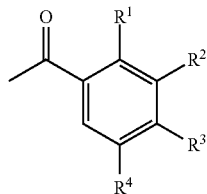

(4)

where
Z is S, O, CH$_2$, or NH,
R$^{1-8}$ are independently H, Cl, Br, I, F, C$_{1-24}$ alkoxy, C$_{1-24}$ alkyl, or aryl; and wherein at least one of R$^{1-8}$ must comprise a —W—X—Y group, where
W is a C$_{1-12}$alkylene or C$_{1-12}$ oxyalkylene,
X is carbonate, urethane, urea, tetramethyldisiloxane or a combination thereof, and
Y is —R$^9$—C(R$^{10}$)=CH$_2$, where R$^9$ is a linear or branched C$_{2-10}$ alkylene or C$_{2-10}$ oxyalkylene, arylene, or derivative thereof, and R$^{10}$ is H or CH$_3$.

A preferred vinyl or acrylic compound for use as monomer (ii) is represented by the structural formula (3A):

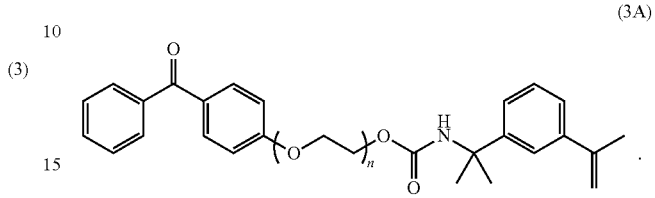

(3A)

where n=1-12, preferably n=1.

Another preferred vinyl or acrylic compound for use as monomer (ii) is represented by the structural formula (3B):

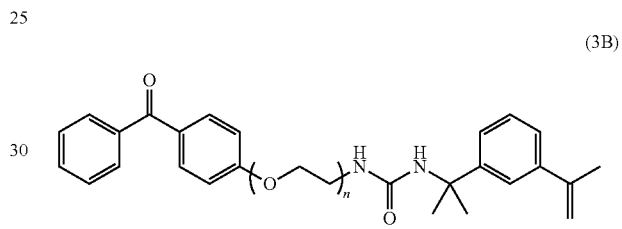

(3B)

where n=1-12, preferably n=1.

Yet another preferred vinyl or acrylic compound for use as monomer (ii) is represented by the structural formula (3C):

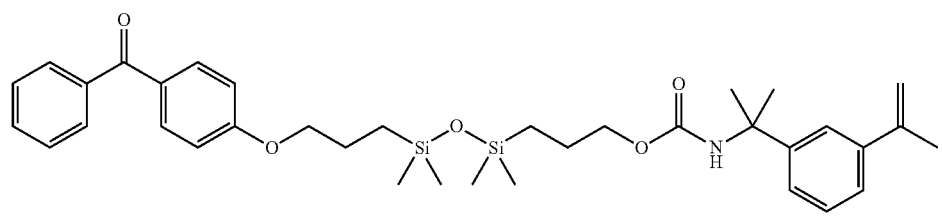

(3C)

Yet another preferred vinyl or acrylic compound for use as monomer (ii) is represented by the structural formula (3D):

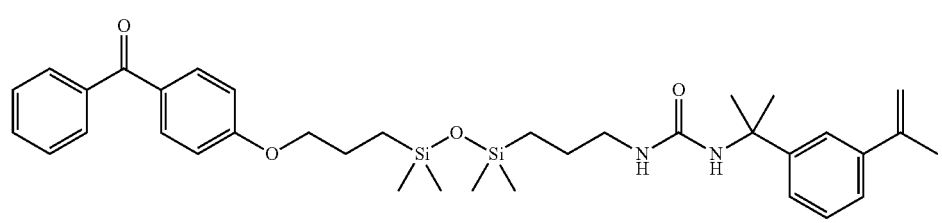

(3D)

Another preferred vinyl or acrylic compound for use as monomer (ii) is represented by the structural formula (4A):

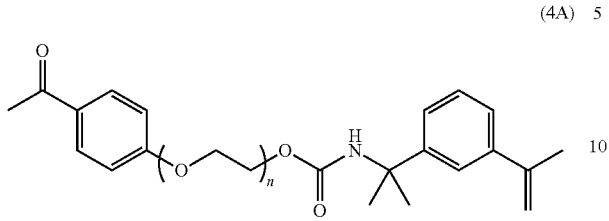

(4A)

where n=1-12, preferably n=1.

Exemplary mono-substituted oxirane (2) of monomer (ii) include glycidyl methacrylate (GMA), 1,2-epoxy-5-hexene, 4-hydroxybutylacrylate glycidyl ether (4-HBAGE), cycloaliphatic epoxide monomer M100 and A400, OXE-10, CD535 epoxide, 4-vinyl-1-cyclohexene-1,2-epoxide. Another example of suitable reactive functional group has the following formula (5A):

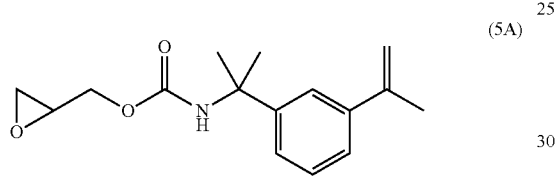

(5A)

The invention also provides the art with UV-crosslinkable adhesives comprising the acrylic polymers herein and a cationic photoinitiator.

The primary function of a photoinitiator is to initiate crosslinking reaction when the photoinitiator is irradiated with UV radiation. There are two main types of photoinitiators that can be used in this invention to initiate the crosslinking upon irradiation: radical photoinitiators and cationic photoinitiators.

The most frequently used cationic photoinitiators are either organic iodonium or sulfonium salts. The mechanism of a cationic photoinitiator, when irradiated, is that it forms an excited state which then breaks down to release a radical cation. This radical cation reacts with the solvent, or other hydrogen atom donors, and generates a protonic acid, which is the active species that initiates the crosslinking reaction.

Any of the many compounds known to initiate polymerization by a cationic mechanism may be used for the crosslinking reaction in this invention. These include, for example, diaryliodonium salts, triarylsulfonium salts, dialkylphenylsulfonium salts, dialkyl(hydroxydialkylphenyl)sulfonium salts and ferrocenium salts. The anions in theses salts generally possess low nucleophilic character and include $SbF_6^-$, $PF_6^-$, $AsF_6^-$, $BF_4^-$, $B(C_6F_5)_4^-$ or $Ga(C_6F_5)_4^-$. Specific examples include Cyracure UVI-6976 (Dow Chemical). Particularly useful cationic initiators are soluble and red-shifted sulfonium salt photoinitiators, which have increased solubility in UV-crosslinkable compositions, promote efficient thick film UV curing, and exhibit increased thermal stability in UV crosslinkable compositions before cure, exhibit increased curing rates, and have a reduced dark cure time, having the structural formula (6A) and (7A):

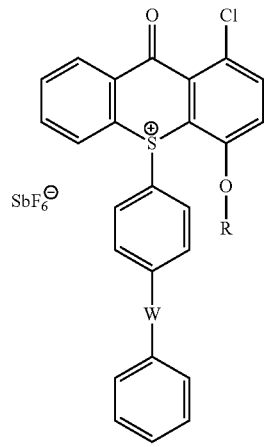

(6A)

where R is $C_3H_7$, $C_{12}H_{25}$, W is S, SO, $SO_2$ or CO.

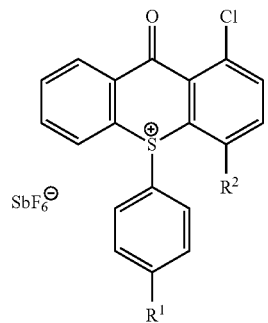

(7A)

where $R^1$ and $R^2$ are independently H, $CH_3$, $C_2H_5$, $C_3H_7$, $C_{12}H_{25}$, $OCH_3$, $OC_2H_5$, $OC_3H_7$, or $OC_{12}H_{25}$.

The adhesive may also comprise various other additives, such as plasticizers, tackifiers, and fillers, all of which are conventionally used in the preparation of PSAs. As tackifier or tackifying resins to be added, it is possible to use any known tackifying resins described in the literature. Non-limiting examples include pinene resins, indene resins, and their disproportionated, hydrogenated, polymerized, and esterified derivatives and salts, the aliphatic and aromatic hydrocarbon resins, terpene resins, terpene-phenolic resins, $C_5$ resins, $C_9$ resins, and other hydrocarbon resins. Any desired combinations of these or other resins may be used in order to adjust the properties of the resultant adhesive in accordance with the desired final properties.

In general, it is possible to use any resin which is compatible with the corresponding acrylic polymers; reference may be made in particular to all aliphatic, aromatic, alkylaromatic hydrocarbon resins, hydrocarbon resins based on hydrocarbon resins, hydrogenated hydrocarbon resins, functional hydrocarbon resins, and natural resins. Explicit reference may be made to the depiction of the state of the art in the "Handbook of Pressure Sensitive Adhesive Technology" by Donatas Satas (van Nostrand, 1989).

In a further advantageous development, one or more plasticizers, such as low molecular weight acrylic polymers, phthalates, benzoates, adipates, or plasticizer resins, are added to the acrylic HMPSAs.

The acrylic PSAs may further be blended with one or more additives such as aging inhibitors, antioxidants, light stabilizers, compounding agents, and/or accelerators.

The adhesive may further be mixed with one or more fillers such as fibers, carbon black, zinc oxide, titanium dioxide, solid or hollow glass microbeads, microbeads of other materials, silica, silicates, and chalk.

For the inventive process it may further be of advantage to add compounds to the acrylic PSAs that facilitate subsequent crosslinking. For this purpose the copolymers may optionally be blended with crosslinkers. Examples of suitable crosslinkers are functional acrylates. Preferred substances in accordance with the inventive process in which crosslinking occurs under radiation are, for example, difunctional or trifunctional acrylates, difunctional or polyfunctional urethane acrylates, difunctional or trifunctional or multi-functional acrylic epoxy resins such as Lumicryl 1000 and 1100 (Estron Chemical). It is, however, also possible here to use any further difunctional or polyfunctional compounds which are familiar to the skilled worker and are capable of crosslinking acrylic polymers. For optional thermal or moisture crosslinking it is possible to use blocked difunctional or polyfunctional isocyanates, (meth)acrylates or other functional groups.

One further development that makes the process of the invention particularly advantageous for the production of hot melt PSAs is that all additives are either blended to the molten, solvent-free acrylic polymers, or more efficiently, added into the solutions of the copolymers at the end of the polymerization reactions. Upon the removal of the solvent, the mixtures are concentrated to give hot melt PSAs.

As known by those skilled in the art, the preparation of acrylic polymers can be carried out by solution, emulsion, or bulk polymerization procedures using well-known polymerization techniques, such as free radical techniques. The copolymers can then be formed into hot melt adhesives by removal of the solvent, coagulation of the latex, or melt-processing of the neat polymers.

The polymerization may be conducted in the presence of one or more organic solvents and/or in the presence of water. Suitable organic solvents or mixtures of solvents are alkanes, such as hexane, heptane, octane, isooctane, and cyclohexane; aromatic hydrocarbons, such as benzene, toluene, and xylene; esters, such as ethyl, propyl, butyl and heptyl acetate; halogenated hydrocarbons, such as chlorobenzene; alkanols, such as methanol, ethanol, iso-propanol, ethylene glycol, and ethylene glycol monomethyl ether; ethers, such as diethyl ether and dibutyl ether; or mixtures thereof.

In one advantageous embodiment of the process, the polymerization reactions proceed in an ethyl acetate solvent, thermally initiated by, for example, azobisisobutyronitrile (AIBN).

The acrylic polymers prepared will generally have a weight averaged average molecular weight ($M_w$) of from 10,000 to 2,000,000 g/mol, more preferably between 50,000 and 1,000,000 g/mol and most preferably between 100,000 and 700,000 g/mol. The $M_w$ is determined by gel permeation chromatography (GPC) or matrix-assisted laser desorption/ionization mass spectrometry (MALDI-MS).

The acrylic polymers can be prepared by polymerizing monomer mixtures of (i) and (ii). Alternatively, preparation of the UV-crosslinkable acrylic polymers may comprise a two step reaction: (1) preparing acrylic polymers that have pendant isocyanate functionality by using m-TMI® (3-isopropenyl-α,α-dimethylbenzyl isocyanate, Cytec) or MOI (2-methacryloyloxyethyl isocyanate, Showa Denko) as a co-monomer in polymerization reactions; and then (2) reacting the pendant isocyanate groups with hydroxyl-functionalized epoxide, oxetane, or benzophenone.

The acrylic polymer does not contain any multi-functional acrylate and is substantially linear in its structure before UV crosslinking reaction. Therefore, the acrylic polymer, before crosslinking, is completely soluble in many organic solvents, and can also be easily applied on substrates in solvent-free form as a hot melt adhesive.

The adhesives can be formulated as a solvent borne adhesive and used by coating films or paper with polymer solutions or suspensions and subsequently removing the solvent by drying.

To be used as hot melt PSAs, the acrylic polymers must be free of the solvent. For this purpose the copolymers prepared as described above are concentrated to a solvent content of less than 2% by weight, preferably less than 0.2% by weight. This process takes place preferably in a reaction tank, or vacuum mixer, concentration extruder, such as vent extruder, ring extruder, single-screw extruder, or twin-screw extruder, which are known to the skilled worker.

Application of the hot melt PSAs may be accomplished using any conventional means, such as roller, slot orifice, spray, or extrusion coating. Non-limiting examples of substrate are films, tapes, sheets, panels, foam, and the like; and can be made of materials such as paper, fabric, plastic (polyesters, PE, PP, BOPP, and PVC), nonwoven fiber, metal, foil, glass, natural rubber, synthetic rubber, wood, or plywood. If a coated substrate is to be used in the form of a self-wound roll, the back of the substrate is usually coated with a release coating to prevent the adhesive from adhering to the reverse side of the substrate. If a substrate is to be coated with the adhesive on both sides and rolled, a strippable paper or other protective means is laid over the adhesive on one side to prevent that adhesive from adhering to the adhesives on the other. In some uses, a second substrate may be applied directly to the adhesive.

In most pressure sensitive adhesive uses, a hot melt adhesive is applied to a backing or substrate before crosslinking. The adhesive is formulated preferably to provide a composition that can be heated to render a coatable fluid on the substrate. Commonly used industrial coating temperatures are in the range of 80-180° C. Typically, the hot melt PSAs of this invention have melt viscosities between 1000-500,000 mPa·s, preferably between 5000-100,000 mPa·s at those application temperatures.

A pressure sensitive adhesive film may be formed by applying the hot melt to a release liner, such as silicone coated paper or plastic film, and then after irradiation, the adhesive may be stripped from the release liner and used as a film. Alternatively, the adhesive can be coated onto a release liner, laminated and transferred to a substrate.

The hot melt PSAs of the invention can be crosslinked in air by irradiation with UV light in the range from 200 to 500 nm, preferably 280 to 400 nm. Irradiation may be done immediately while the adhesive compositions are still in a melt form, or after they have been cooled to room temperature.

Adhesive composition is irradiated for a period of time sufficient to transform the low cohesion composition into a viscoelastic adhesive of higher modulus. The exact length of the exposure is dependent upon the nature and intensity of the radiation, the amount of cationic photoinitiator, the polymer composition, adhesive formulation, the thickness of the adhesive film, environmental factors, and the distance between the radiation source and the adhesive film. The dosage or the length of exposure is conveniently controlled by the belt speed. It may be appropriate to adapt the lamp output to the belt speed or to shade off the belt partly, in order to reduce its thermal load.

Actinic light from any source may be used on the adhesive, provided the source furnishes an effective amount of UV radiation. Suitable sources of radiation are carbon arcs, mercury-vapor arcs, fluorescent lamps with special ultraviolet light emitting phosphors, electronic flash lamps and the like, lasers of specific wavelengths, UV LED, or combinations of those. Preferred lamps are the electrodeless microwave powered lamps from Fusion Systems, or commercially customary high or medium pressure mercury lamps with an output of, for example, from 80 to 240 W/cm. The adhesive compositions of the invention generally exhibit their maximum sensitivity to wavelengths in the ultraviolet range.

In addition, the acrylic hot melt PSAs described in accordance with the invention may be crosslinked with electron beams. This type of crosslinking can also take place in addition to the UV crosslinking.

The adhesives of the present invention may be used to bond one substrate to a second substrate. Substrates include but are not limited to plastic, glass or plastic-coated glass, wood, metal, etc. The adhesive may be applied by a variety of methods including coating or spraying in an amount sufficient to cause the substrates to be bonded together to adhere. The adhesive coated substrate may be irradiated before or after bonding. Since cure begins immediately upon irradiation, but may not be completed for several days, there is time immediately after irradiation, but before gelation for bonding to take place.

The pressure sensitive adhesives of the invention may advantageously be used in the manufacture of adhesive articles including, but not limited to, industrial tapes and transfer films. Single and double face tapes, as well as supported and unsupported free films are encompassed by the invention. In one embodiment, the adhesive article comprises an adhesive coated on at least one major surface of a backing having a first and second major surface. Useful backing substrates include, but are not limited to foam, metal, paper, fabric, and various polymers such as polypropylene, polyamide, polyester, polyethylene terephthalate, and mixtures thereof. The adhesive may be present on one or both surfaces of the backing. When the adhesive is coated on both surfaces of the backing, the adhesive coatings can be the same or different.

The following examples are provided for illustrative purposes only.

EXAMPLES

Adhesive samples were tested according to the following test methods for pressure sensitive tapes, some of which were developed by the Pressure Sensitive Tape Council (PSTC) or by FINAT (Féderation INternationale des fabricants et transformateurs d'Adhésifs et Thermocollants sur papier et autres supports).

Gel Fraction

The percent gel fraction was used as an indication of crosslinking level and photoinitiator efficiency.

A sample of UV-irradiated acrylic polymer (or formulated adhesive) was separated from the silicone release liner and weighed to the nearest 0.1 mg. The sample was then placed in a glass jar and immersed in toluene for 24 to 48 hours. The ratio of the sample mass after toluene extraction to the initial mass gave the gel fraction expressed as a percentage. If the sample was a formulated adhesive, the mass of any toluene-soluble component such as a tackifying resin was subtracted from the initial weight.

Preparation of Adhesive Coatings

A lab coater with two heatable rolls was used to apply the adhesive. The adhesive was heated to 150° C. and coated onto a 2 mil (51 µm) thick silicone-coated PET release liner. The adhesive on the liner was irradiated at a line speed of 15 meters per minutes under H-bulb (Fusion Systems) with a dosage of UV C 257 mJ/cm$^2$. The film was then laminated and transferred to a polyethylene terephthalate substrate (Mylar®, DuPont) and conditioned at 23° C. and 50% relative humidity. Unless otherwise indicated, the adhesive film thickness was 3.5 mil (89 µm).

UV Cure

Adhesive films were cured using medium pressure mercury arc lamps (using an IST UV curing laboratory unit). The UV C dose was measured and recorded using an EIT Power Puck. UV C is the region between 200 and 280 nm.

Loop Tack

Loop Tack was measured according to Test Method B, PSTC-16, adapted as follows. A loop tack tester was used for the measurement. All test samples of the acrylic polymers were UV-irradiated according to the procedure described above. The adhesive was coated on 50 µm PET film backing and the size of a specimen strip was 125 mm×24 mm.

Peel Adhesion

Adhesives were cast in a range of coating weights (from 20-100 g/m$^2$) film onto a silicone liner using a CHEMSULANTS® hot melt laminator coater then cured (as noted above). The cured free film was transferred to 50 µm PET backing film.

Peel adhesion was measured as the force required to remove a pressure sensitive tape from a standard stainless steel panel at a specified angle and speed according to FINAT Test Method no. 1 adapted as follows. Equipment used to measure this value included a standard FINAT 2 kg rubber-covered roller, and a standard INSTRON® tensile testing machine.

A stainless steel panel (AFERA steel from Rocholl GmbH) was cleaned as per standard FINAT method. Before the stainless steel panel was used it was abraded along the length of the test panel with a 400-grit waterproof wet and dry sanding paper under the tap, until water flowed smoothly over the steel plate. After this it was rinsed with water and dried, cleaned with ethyl acetate, and conditioned in a controlled climate room maintained at 23° C. and 50% relative humidity (RH), for at least 1 hour.

The coating to be tested was conditioned for 24 hours at 23° C.±2° C. and 50%+5% RH. Test strips were cut to 25 mm×175 mm.

The backing paper was removed from each strip and placed, adhesive side down, onto a clean test plate using light finger pressure, and then rolled twice in each direction with the standard 2 kg FINAT test roller, at a speed of approximately 10 mm per second. After applying the strips to the test plate at a rate of one per 2 minutes the strips were left until the first test piece had either 20 minutes or 24 hours elapsed time (dwell).

The tensile tester was set with a crosshead speed of 300 mm/minute. The free end of the tape was doubled back at an angle of 180° and clamped to the upper jaw of the machine. The end of the panel was clamped to the lower jaw. The test strip was then peeled from the panel and the peel force was recorded in Newtons/25 mm width of tape.

The results obtained for adhesive mode failure were classified as Adhesion Failure (test piece separated from test plate without leaving any residue) or Cohesive Failure (adhesive film split cohesively and residue left on test piece and test plate).

Shear Adhesion Failure Temperature (SAFT)

Three samples, 25 mm×100 mm in dimensions, were cut from each cured sample in the machine coating direction. SAFT panels (mirrored Steel) were cleaned with ethyl acetate. Samples were adhered to the steel panel overlapping up to an engraved line so that a square 25×25 mm of adhesive was in contact with the test panel. The test area was rubbed using a straight edged wooden applicator to ensure good contact between the panel and test sample. Samples were placed into the test oven at room temperature. The heating program was started and 1 kg shear load applied when the temperature reached 40° C. The oven temperature was ramped at 0.5° C./minute up to 200° C. and the failure temperature (SAFT) was recorded.

Shear Resistance

Shear Resistance from a stainless steel surface was measured according to FINAT Test Method no. 8 adapted as follows. Three samples, 25 mm×100 mm in dimensions, were cut from each cured coating in the machine direction. Shear panels (pregritted steel) were cleaned with ethyl acetate. Samples were adhered to the steel panel up to the engraved line so that a square 25×25 mm of adhesive was in contact with the test panel. The test area was rubbed using a straight edged wooden applicator to ensure good contact between the panel and test sample. The test specimens were conditioned for 15 minutes at 23° C.±2° C. and 50%+5% RH. They were then mounted in the test fixture and a 1 or 2 kg weight applied. The time to failure was recorded.

Hot Shear Resistance

The above procedure for shear resistance was followed except that the test specimens were placed into a preheated oven at 70° C., and left to acclimatize for 10 minutes. A 1 kg weight was applied and the time to failure recorded.

Viscosity

Viscosity was measured by Brookfield DV-I Viscometer at 135° C., as shown in FIG. 1. A 10 g sample was used with a spindle No 27 at a speed setting of 4 rpm.

Example 1

A 500 mL three-necked round bottom flask was equipped with a reflux condenser, addition funnel and magnetic stirrer, and placed under gentle nitrogen flow. The flask was charged with 1,1,3,3-tetramethyldisiloxane (TMDS, 364 mL, 2.06 mol). The addition funnel was charged with allyl alcohol (20.0 g, 0.34 mol). Approximately 2 mL of allyl alcohol was added to the reaction flask. The heating bath temperature was raised to 50° C., at which point chlorotris(triphenylphosphine) rhodium (40 ppm or 18.7 mg) was added to the reaction flask. The internal reaction temperature was then raised to 70° C. The ally alcohol was added dropwise to the reactor over a period of 30 min, while the reaction mixture was maintained at an internal temperature less than 75° C. A steady reaction exotherm was observed during the addition. The reaction was stirred at 70° C. for 10 minutes after the addition was complete. FT-IR analysis indicated complete consumption of the allyl double bonds by the disappearance of the C═C stretching bands between 1645 cm-1 and 1606 cm-1. The reaction was allowed to cool to below 40° C., at which point excess TMDS was removed by distillation under vacuum. The TMDS was pure, as determined by GC, $^1$H NMR and $^{29}$Si analysis, and could be recycled. A light yellow oil was obtained as an intermediate.

A 500 mL one-necked round bottom flask was equipped with a reflux condenser and magnetic stirrer, and placed under gentle nitrogen flow. A solution of the above intermediate, and 4-vinyl cyclohexene 1,2-epoxide (42 g, 0.34 mol) in toluene (anhydrous, 200 mL) was charged and stirred at 75-85° C. Platinum-cyclovinylmethylsiloxane complex in cyclic methylvinylsiloxanes (15 mg) was added and the reaction mixture was continuously stirred for about 24 h. The reaction process was monitored by FTIR until the disappearance of the SiH peak (~2119 cm$^{-1}$).

The reaction mixture was cooled to 60° C. and 3-isopropenyl-α,α-dimethylbenzyl isocyanate (m-TMI, 69 g, 0.34 mol) and dibutyltin dilaurate (0.06 g, 0.1 mmol) were added subsequently. The reaction process was monitored by FTIR and completed when the isocyanate peak (~2260 cm$^{-1}$) disappeared. The solvent was then removed under vacuum at room temperature and the product was collected as a light yellow liquid with a quantitative yield. The identity of this compound was confirmed by $^1$H NMR to have the following structure (1F):

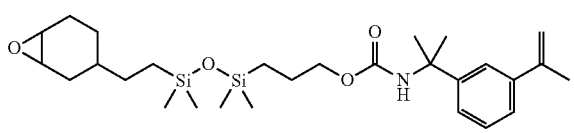

(1F)

Example 2

A solution of 3-cyclohexene-1-carboxaldehyde (30 g, 0.27 mol), 2-aminoethyl methacrylate hydrochloride (67 g, 0.4 mol), 2-hydroperoxy-2-methylpropane (40 mL, 0.3 mol), CuI (0.5 g, 2.7 mmol), AgIO$_3$ (0.76 g, 2.7 mmol) and CaCO$_3$ (60 g, 0.6 mol) in acetonitrile (100 mL) was stirred at 40° C. for 24 hr. The reaction mixture was cooled to room temperature. Oxone (330 g, 0.53 mol) and deionized water (100 mL) were added and the mixture was stirred for 3 hr at room temperature. The reaction mixture was extracted with toluene and washed with de-ionized water. The solvent was then removed under vacuum at room temperature and the product was collected as a liquid with a quantitative yield. The identity of this compound was confirmed by $^1$H NMR to have the following structure (1H, where R=Me)

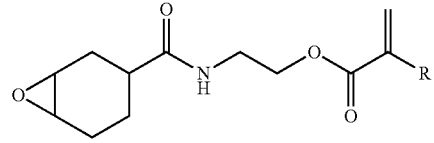

(1H)

Example 3

A solution of 1-methanol-3,4-cyclohexene (9.6 g, 86 mmol), methyl methacrylate (7.5 g, 87 mmol), and methanesulfonic acid (0.5 g, 5.2 mmol) in toluene (150 mL) was stirred at 120° C. for 2 hr. The reaction mixture was cooled to room temperature. Sodium bicarbonate (60 g, 0.71 mol), oxone (120 g, 195 mmol), acetone (100 mL), and deionized water (100 mL) were added and the mixture was stirred for 3 hr at room temperature. The reaction mixture was allowed to stand for 1 hr to phase separate. The water layer was removed. The organic layer was dried with anhydrous magnesium sulfate and toluene was then removed under vacuum at room temperature. The final product was collected as a light yellow liquid with a quantitative yield. The identity of this compound was confirmed by $^1$H NMR and GC-MS to have the following structure, 1-methacrylomethyl-3,4-cyclohexene epoxide (1J).

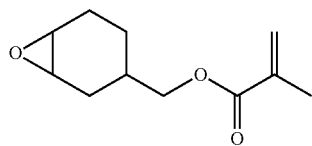

(1J)

The acrylate version of this monomer can be prepared by the same procedure.

Example 4

The polymer compositions in Table 1 were prepared following the same procedure which is described here in detail for Polymer I.

TABLE 1

Copolymer compositions (constituent monomers in wt. %)

| | Polymer | | | | | | | | | | |
|---|---|---|---|---|---|---|---|---|---|---|---|
| | I | II | III | IV | V | VI | VII | VIII | IX | X | XI |
| 2-EHA | 49.9 | 50.2 | 49.6 | 49.9 | 49.9 | 49.9 | 49.9 | 52.1 | 51.9 | 51.2 | 52.0 |
| MA | 48.1 | 48.3 | 47.8 | 48.0 | 48.0 | 48.0 | 48.0 | 46.5 | 46.4 | 45.7 | 46.2 |
| GMA | 1.5 | 0 | 2.0 | 1.5 | 1.5 | 1.5 | 1.5 | — | 1.5 | — | — |
| M100 | 0.5 | 0.5 | — | — | — | — | — | — | — | — | — |
| OXE-10 | — | — | — | 0.6 | — | — | — | — | — | — | — |
| 5A | — | 1.0 | — | — | — | — | — | — | — | — | — |
| 1A | — | — | 0.6 | — | — | — | — | — | — | — | — |
| 1F | — | — | — | — | 0.6 | — | — | — | — | — | — |
| 1H | — | — | — | — | — | 0.6 | — | — | — | — | — |
| 3A | — | — | — | — | — | — | 0.6 | — | — | — | — |
| 1J | — | — | — | — | — | — | — | 1.4 | 0.2 | 1.2 | 0.5 |
| HPMA | — | — | — | — | — | — | — | — | — | 2.0 | 0 |
| HBAGE | — | — | — | — | — | — | — | — | — | — | 1.3 |

A four-neck 1 L round-bottom polymerization flask was equipped with a thermometer connected to a temperature control device, a condenser, an overhead mechanical stirrer, two addition funnels, and nitrogen inlet/outlet. The set-up was purged with nitrogen gas for 15 min. A mixture of the following monomers was prepared: 2-ethylhexyacrylate (2-EHA, 99.8 g), methyl acrylate (MA, 96.2 g), glycidyl methacrylate (GMA, 3.0 g), 1-acrylomethyl-3,4-cyclohexene epoxide (M100, 1.0 g). To one of the funnels was charged 160 g of the monomer mixture. To another funnel was charged the initiator 2,2'-azobis-(2-methyl propionitrile) (AIBN, 0.5 g) and ethyl acetate (60 mL) To the polymerization flask was charged the remaining monomer mix (40 g), initiator AIBN (0.27 g), and ethyl acetate (100 mL). The mixture was heated to vigorous reflux (76-80° C.) and held for 15 minutes. Then, the monomer mix in the funnel was added continuously over 2 hr at a constant rate. Simultaneously, the initiator solution in the funnel was added continuously over 3 hr at a constant rate. Upon complete addition of initiator solution, the mixture was stirred for an additional 2 hr at reflux. A short half-life initiator (0.75 g) and ethyl acetate (25 mL) were charged into the initiator funnel and then added into the polymerization flask over 1 hr to reduce residual monomers. The polymerization solution was cooled to 60° C. and cationic photoinitiator Cyracure UVI-6976 (1.0 g, 50% in propylene carbonate) was added and mixed thoroughly for 15 minutes. After ethyl acetate was removed by under vacuum at 55-60° C., acrylic polymer (I) was obtained with $M_w$ of approximately 97,000 determined by GPC. The viscosity (Brookfield) of the polymer was about 40,000 mPa·s at 135° C. The properties of the adhesive film were as follows: shear resistance (2 kg weight, 25 mm×25 mm area)>168 hr at 21° C. on stainless steel panel, peel strength 19 N/25 mm on stainless steel panel, loop tack 23 N/25 mm on stainless steel panel, SAFT 171° C. on PET film and 160° C. on an aluminum foil backing.

Example 5

The viscosities at 135° C. of polymers prepared in Example 4 and their cured adhesive film (2 mil, 50 μm) properties on stainless steel were measured. Shear resistance was measured using a 1 kg or 2 kg weight, as indicated, with 25×25 mm bond area. SAFT was measured using both PET and aluminum foil backing films.

TABLE 2

Adhesive properties

| Polymer | Viscosity mPa · s | Peel N/25 mm | Loop Tack N/25 mm | Shear hours | SAFT ° C. | |
|---|---|---|---|---|---|---|
| | | | | | PET | Al |
| I | 40,000 | 19 | 23 | >168 (1 kg) | 171 | 160 |
| II | 52,000 | 24 | 28 | 6 (2 kg) | 110 | 125 |
| III | 46,000 | 19 | 24 | >168 (1 kg) | >190 | >190 |

Example 6

Comparative Polymer Compositions

Polymers XII and XIII were prepared in the same manner as Example 4. Besides the cationic photoinitiators, Cyacure UVI-6976, Polymers XII and XIII were synthesized using a mono-substituted oxirane monomer, and their compositions are shown in Table 3.

TABLE 3

Comparative copolymer compositions (constituent monomers in wt. %)

|  | Polymer | |
| --- | --- | --- |
|  | XII | XIII |
| 2-EHA | 49.9 | 49.9 |
| MA | 48.1 | 48.1 |
| GMA | 2 | 0 |
| 4-HBAGE | 0 | 2 |

The viscosity at 135° C. of Polymer XII was 46,500 mPa·s initially, and it increased very quickly and gelled in less than 2 hr.

The viscosity at 135° C. of Polymer XIII was 38,750 mPa·s initially, and it increased 10% at 135° C. in 7 hours. The adhesive film was not fully cured upon UV irradiation and had no green strength. However, it continued the dark-cure in 24 hours. The shear strength of the adhesive film, after one week of dark-cure, was >168 hr (2 kg, 25 mm×25 mm) at 21° C. on stainless steel panel.

Example 7

An adhesive formulation was made using the acrylic polymer (VIII) of Example 4 (75 wt %), KRISTALEX® F85, Eastman, Netherland (15 wt %), and EVA 28-150 (10 wt. %). Peel adhesion values, measured at 20 minutes and 24 hours with stainless steel 50 μm PET, are listed in Table 4.

TABLE 4

Peel adhesion from stainless steel 50 μm PET

| Dose (mJ/cm$^2$) UVC | 20 g/m$^2$ | 40 g/m$^2$ | 60 g/m$^2$ | 100 g/m$^2$ |
| --- | --- | --- | --- | --- |
| Peel Adhesion (N/25 mm) at 20 minutes | | | | |
| 5 | 15.2 | 16.8 | 21.0 | 21.3 |
| 10 | 12.8 | 16.2 | 18.8 | 22.5 |
| 20 | 3.6 | 15.9 | 16.1 | 22.2 |
| 40 | 12.5 | 17.0 | 18.5 | 19.1 |
| 60 | 12.5 | 15.7 | 17.4 | 20.0 |
| Peel Adhesion (N/25 mm) at 24 hours | | | | |
| 5 | 23.1 | 23.1 | 32.5 | 29.9 |
| 10 | 18.0 | 25.1 | 28.3 | 38.9 |
| 20 | 12.2 | 23.5 | 23.5 | 37.4 |
| 40 | 15.3 | 17.1 | 25.4 | 30.9 |
| 60 | 16.2 | 21.3 | 24.2 | 30.5 |

All peel adhesion resulted in adhesive failure mode

The peel adhesion values indicate that the cationic formulation can be cured at a variety of dose levels and coat weights typically used in the tapes and labels industry.

SAFT experiments were conducted from 40 to 200° C. at 1 kg load, bond area 25 by 25 mm, on mirrored stainless steel, and the failure temperatures are shown in Table 5. Hot shear resistance results are also shown in Table 5.

TABLE 5

SAFT test and Shear test results

| Dose (mJ/cm$^2$) UVC | 20 g/m$^2$ | 40 g/m$^2$ | 60 g/m$^2$ | 100 g/m$^2$ |
| --- | --- | --- | --- | --- |
| SAFT (° C.) | | | | |
| 5 | >200* | >200* | >200* | 127° C. |
| 10 | >200* | >200 | >200* | 170° C. |
| 20 | >200* | >200* | >200* | >200* |
| 40 | 178° C. | 178° C. | >200* | >200* |
| 60 | 177° C. | >200* | >200* | >200* |
| Hot Shear Resistance (hrs) | | | | |
| 5 | >120* | >120* | >120* | >120* |
| 10 | >120* | >120* | >120* | >120* |
| 20 | >120* | >120* | >120* | >120* |
| 40 | >120* | >120* | >120* | >120* |
| 60 | >120* | >120* | >120* | >120* |

*Test was terminated before failure occurred.

The results from the SAFT experiment in Table 5 indicate that the adhesive can maintain high temperature holding. The results from the hot shear resistance experiment in Table 5 demonstrate that the adhesive has a robust curing window because it cures completely over a wide range of UVC doses and coating weights.

Example 8

A first set of adhesive films having compositions according to the examples listed in Table 6 were coated at 25° C., 50% RH, on release liner, dried, UV cured and then laminated to PET film backing in the usual manner in preparation for peel adhesion testing.

A second set of adhesive films, following coating and drying were placed in a chamber set to a controlled environment of 25° C., 50% RH, for 72 hours, with one adhesive surface exposed to the air. After conditioning for 72 hours, the films were then UV cured and laminated. Adhesive properties for the two sets of adhesive films are compared in Table 6.

TABLE 6

Cured adhesive properties following exposure to moisture

|  | Coat Weight (g/m$^2$) | Dose (mJ/cm$^2$) UVC | Coated at 25% RH and 25° C. and UV cured immediately following coating | Exposed to 50% RH and 25° C. for 72 hours before UV curing |
| --- | --- | --- | --- | --- |
| Peel |  |  | N/25 mm | N/25 mm |
| Ex 11 | 67 | 60 | 27.1 | 25.0 |
| Ex 9 | 60 | 80 | 28.1 | 20.0 |
| Polymer X | 60 | 80 | 16.9 | 12.7 |
| SAFT |  |  | ° C. | ° C. |
| Ex 11 | 67 | 60 | 167-200 | >200* |
| EX 9 | 60 | 80 | >200* | >200* |
| Polymer X | 60 | 80 | >200* | >200* |
| Hot Shear |  |  | Hrs | Hrs |
| Ex 11 | 67 | 60 | 127-168 | >168* |
| EX 9 | 60 | 80 | >168* | >168* |
| Polymer X | 60 | 80 | >168* | >168* |

*Test was terminated before failure occurred.

The presence of water in cationic epoxies during UV curing usually quenches the propagating superacid species, leading to decreased crosslinking, and thereby decreases cohesive properties in the adhesive. Surprisingly, the above results indicate that the presence of water resulting from exposure to a humid environment did not negatively affect the cured adhesives of this invention.

Example 9

A formulation was made of Polymer VIII (90 wt %) and Foral 85E (10 wt %), and the adhesive properties are summarized in Table 7.

TABLE 7

Adhesive properties with the addition of a tackifier

| UVC Dose (mJ/cm$^2$) | Coat Weight (g/m$^2$) | | |
|---|---|---|---|
| Peel | | 20 min (N/25 mm) | 24 hrs (N/25 mm) |
| 60 | 60 | 11.9 | 12.4 |
| 125 | 60 | 10.7 | 13.1 |
| SAFT | | Failure temp (° C.) | |
| 60 | 60 | >200* | |
| 125 | 60 | >200* | |
| Hot shear | | Hrs | |
| 60 | 60 | Not tested | |
| 125 | 60 | >168* | |

*Test was terminated before failure occurred.

Surprisingly, the above results indicate that addition of tackifier did not negatively affect the adhesive properties.

Example 10

A formulation was made of Polymer VIII (80 wt %), Foral 85E (10 wt %) and LICOCENE® PP 1302, Clariant (10 wt %) and the adhesive properties are summarized in Table 8.

TABLE 8

Adhesive properties with the addition of a tackifier and an ethylene copolymer

| Dose (mJ/cm$^2$) UVC | Coat Weight (g/m$^2$) | | |
|---|---|---|---|
| Peel | | 20 min (N/25 mm) | 24 hrs (N/25 mm) |
| 60 | 80 | 18.9 | 20.4 |
| SAFT | | Failure temp (° C.) | |
| 60 | 80 | >200* | |
| Hot shear | | Hr | |
| 60 | 80 | Not tested | |
| 60 | 20 | >168* | |

*Test was terminated before failure occurred.

Surprisingly, the above data indicates that the addition of the polyethylene copolymer improves the peel adhesion of the adhesive without the loss of cohesion in comparison to Example 9 under similar conditions of coat weight and UV dose.

Example 11

An adhesive formulation was made using the acrylic Polymer VIII (80 wt %), Kristalex F85 (20 wt %), and the adhesive properties are summarized in Table 9.

TABLE 9

Adhesive properties with the addition of an aromatic tackifier

| Dose (mJ/cm$^2$) UVC | Coat Weight (g/m$^2$) | | |
|---|---|---|---|
| Peel | | 20 min | 24 hrs |
| 60 | 63 | 17.0 | 25.0 |
| 115 | 115 | 20.0 | 26.9 |
| SAFT | | Failure temp (° C.) | |
| 60 | 63 | >200* | |
| 115 | 115 | >200* | |
| Hot shear | | Hours | |
| 60 | 63 | >168* | |
| 115 | 115 | >168* | |

*Test was terminated before failure occurred.

Typically, the addition of tackifier in adhesive results in lower cohesive properties. An aromatic tackifier is expected to result in even greater loss of cohesion due to strong UV absorption by the aromatic rings. Surprisingly, the above data indicates that even an addition of 20% aromatic tackifier in the formulation resulted in good adhesive properties.

FIG. 1 shows the viscosity over time for Polymer VIII and Polymer IX. The viscosity of each sample was measured by a Brookfield viscometer at 130° C. Polymer VIII, according to this FIG. 1, had a stable viscosity around 45,000 mPa·s for about 300 minutes. The formulated adhesive, Examples 9, also exhibited stable viscosity, even up to 140° C., which indicates a long usable pot life.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An ultra-violet curable pressure sensitive adhesive comprising an acrylic polymer and a cationic photoinitiator, wherein said acrylic polymer comprises:
   (i) an acrylic monomer consisting of an acrylic or methacrylic acid derivative of the formula $CH_2=CH(R_1)(COOR_2)$, wherein $R_1$ is H or $CH_3$ and $R_2$ is $C_{1-20}$ alkyl chain;
   (ii) a monomer, wherein the monomer comprises a pendant reactive functional groups selected from
      (1) mono-substituted oxirane, and
      (2) cycloaliphatic epoxide having the formula:

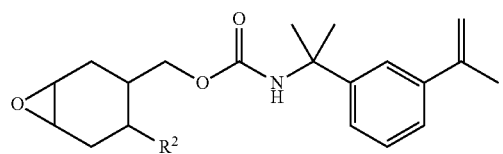

where $R^2$ = H or $CH_3$,

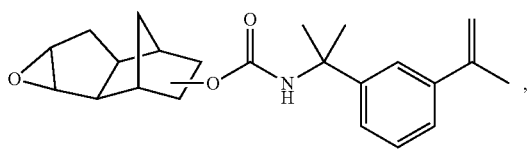

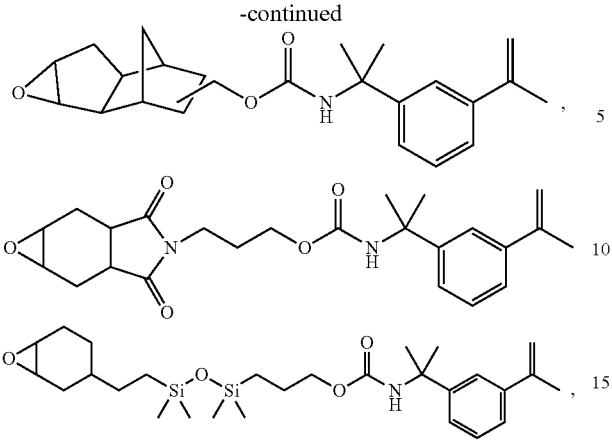

or mixtures thereof, and wherein said monomer contains from about 0.001 to about 0.015 equivalent per 100 g of said acrylic polymer; and wherein said acrylic polymer (a) is essentially free of multi-(meth)acrylate (b) has a Tg value less than 0° C., and (c) has a weight average molecular weight from about 50,000 to about 1,000,000 g/mol.

2. The ultra-violet curable pressure sensitive adhesive of claim 1 wherein the (ii) monomer contain from about 0.002 to about 0.010 equivalent per 100 g of the acrylic polymer.

3. The ultra-violet curable pressure sensitive adhesive of claim 1 wherein the (ii) monomer is a cycloaliphatic epoxide having the formula:

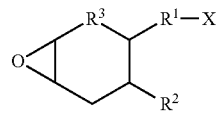

wherein $R^1$ is O, S, C=O, or linear, branched, or cyclic alkylene, or oxyalkylene, arylene, $R^2$ is linear, branched, and cyclic alkyl or alkoxy, aryl, H, halogen, C=O, or part of $R^1$ as fused cycloaliphatic ring through a covalent bond connection, $R^3$ is $(CH_2)_n$, n=0-3, X is acrylate or methacrylate, or comprises a —W—Y group, where W is O, S, amide, carbonate, urethane, urea, siloxane or a combination thereof, and Y is —$R^4$—C($R^5$)=$CH_2$, where $R^4$ is a linear or branched $C_{2-10}$ alkylene, $C_{2-10}$ oxyalkylene, C=O, or arylene or derivative thereof, and $R^5$ is H or $CH_3$.

4. The ultra-violet curable pressure sensitive adhesive of claim 1 wherein the cycloaliphatic epoxide is:

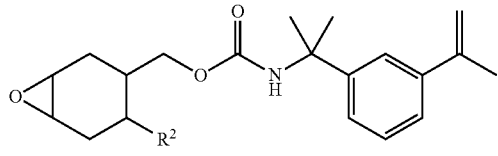

where $R^2$ = H or $CH_3$,

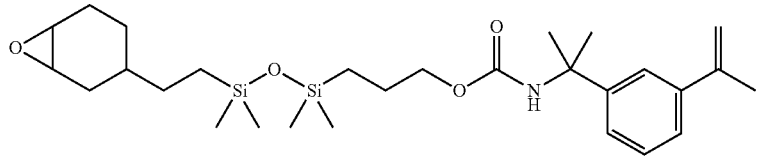

or mixtures thereof.

* * * * *